United States Patent
Kolibas

[15] 3,690,646
[45] Sept. 12, 1972

[54] ELECTROSTATIC CONVEYOR

[72] Inventor: James A. Kolibas, Broadview Heights, Ohio

[73] Assignee: Addressograph-Multigraph Corporation, Cleveland, Ohio

[22] Filed: July 8, 1970

[21] Appl. No.: 53,053

[52] U.S. Cl. ............... 271/45, 271/63 A, 271/75
[51] Int. Cl. ............................................. B65h 5/02
[58] Field of Search .......... 271/45, 51, 63 A; 310/6, 7

[56] References Cited

UNITED STATES PATENTS

| | | |
|---|---|---|
| 2,576,882 | 11/1951 | Koole et al. ............ 271/45 X |
| 3,437,336 | 4/1969 | Enke et al. ............... 271/45 |
| 2,410,611 | 11/1946 | Pratt et al. ................ 271/45 |
| 3,256,450 | 6/1966 | Gartner ........................ 310/6 |
| 2,572,765 | 11/1951 | Roudaut ...................... 310/7 |
| 3,351,340 | 11/1967 | Levine ........................ 271/51 |
| 3,495,821 | 2/1970 | Raterman ................... 271/51 |

Primary Examiner—Joseph Wegbreit
Attorney—Russell L. Root and Ray S. Pyle

[57] ABSTRACT

An electrostatic conveyor including a machine frame defining a feed table and a conveyor including a plurality of belts which move across the table to convey sheet material. The moving conveyor belts, along with charging members connected to the feed table, and the feed table itself define an electrostatic generator. The generator establishes an electrostatic field between sheets on the conveyor and the feed table. The field creates an electrostatic force which urges the sheets toward the table thereby frictionally engaging the sheets and the conveyor belts so that sheets are conveyed along the table by the belts.

15 Claims, 4 Drawing Figures

PATENTED SEP 12 1972  3,690,646

JAMES A. KOLIBAS
INVENTOR
BY Ray S Pyle
ATTORNEY

ELECTROSTATIC CONVEYOR

BACKGROUND OF THE INVENTION

Field of the Invention

The present invention relates to conveyors and more particularly relates to conveyors utilizing electrostatic forces to promote the conveyance of sheet or film-like articles.

Conveyors for sheet or film-like materials have been subject to several major problems which have been related to the nature of the material being conveyed, the conveying speeds which have sometimes been required, and the purpose and function of apparatus associated with the conveyors.

This invention has solved a severe problem wherein sheet material moved along a flat plane by one conveyor, is transferred to a conveyor sloping upwardly at an angle that encourages slippage. However, the invention is applicable to many sheet conveying situations.

Another example of an environment in which a sheet conveyor must operate at high speed under demanding circumstances is found in an "on-line" printed sheet conveyor between a lithographic printing press and a sheet collator.

In this environment, the conveyor must convey individual recently printed sheets of paper, or the like, from the printing press to a given pocket location in the collator at least at the rate at which sheets are delivered from the press. Since the printing rate of lithographic presses can be quite high, the associated conveyor must operate at a high enough speed that separation between successive sheets is adequately large for proper handling by the collating apparatus being used. By operating the conveyor at a selected speed, the sheet spacing can be maintained, decreased or increased.

In such an environment, there are a number of requirements which must be met by the conveyor in order to perform in an optimum manner. Some of these are: (1) substantially positive engagement of the sheets with the conveyor; (2) high conveying speeds; (3) avoidance of "tracking" ink on recently printed sheets; and, (4) maintenance of traction with, or control of, sheets which are misaligned with the conveyor.

Positive engagement of sheets by the conveyor insures against sheet slippage and possible resultant reductions in the interval between successive sheets. In order to assure positive engagement, some means for establishing significant engagement forces between sheets and moving conveyor members must be employed.

High speed operation requires that the sheets be maintained on the conveyor by forces which are sufficiently large to overcome the aerodynamic lift exerted on the sheets. This lifting is created by their speed through the atmosphere surrounding the conveyor.

Sheets recently printed in a lithographic printing press bear ink images which are moist. The ink on the sheets is subject to "tracking" when contacted by elements of sheet handling apparatus such as a conveyor. Tracking occurs whenever the ink is smeared, deposited on a sheet at an unprinted location, or removed from a printed location on a sheet. In order to avoid tracking, sheets are usually conveyed by the apparatus in such a way that relative movement between the sheets and sheet supporting surfaces is avoided wherever possible. This requires that the sheets be positively driven or conveyed while avoiding contacting the printing on the sheet.

Because of the structural characteristics of sheets of paper or similar film-like material, such articles are subject to misalignment on conveyors. The conveyor must be capable of maintaining control over misaligned sheets as they are being conveyed. For optimum performance, a conveyor should be constructed so that misalignment of sheets will not materially reduce the engagement forces between the conveyor and misaligned sheet. If misalignment causes these forces to be significantly reduced, aerodynamic lift-off, slipping and tracking can result. This is particularly objectionable when an apparatus such as a collator is associated with the conveyor, since collator jamming is apt to occur if a sheet fed to it is not properly oriented.

The Prior Art

Various proposals have been made to attempt to accomplish high speed paper or film conveying with minimum ink tracking and positive engagement of the material while maintaining control over the material even when misaligned. For example, it has been proposed to establish pressure differentials across sheets and conveyor belts so that the sheets are held in position on the conveyor belts by differential pressure forces. Ports are provided in the conveyor which communicate with a source of subatmospheric pressure. When sheets register with these ports the pressure differential is established. The pressure force holding the sheet on the conveyor is proportional to the number of ports the sheet registers with at any given time. This apparatus has operated reasonably well in avoiding tracking at high conveyor speeds except when conveyed sheets are misaligned with the conveyor.

When a sheet is misaligned with the conveyor, the sheet registers with a relatively small number of vacuum ports at any given time. This reduces the total force tending to hold the sheet in engagement with the conveyor belts. Aerodynamic lift off of portions of the sheet then occurs. When part of a sheet lifts off the conveyor, the sheet can jam in associated apparatus. Tracking may also occur as a result of relative movement between the sheet and the belts when the engagement forces are reduced.

Other sheet conveyor concepts employing rollers, grippers, etc. have been beset by tracking problems and speed limitations as well as by difficulties arising from the presence of misaligned sheets in the apparatus.

Another problem which has affected some prior art conveyors and sheet handling apparatus has been that paper, film-like articles, etc., frequently take on undesired electrostatic charges while being conveyed. These electrostatic charges frequently induce sufficiently large electrostatic forces acting on the material that the materials are difficult to control or handle as desired in the apparatus. Electrostatic charges on such material in sheet form has also resulted in stacked sheets tightly clinging to each other. This frustrates further sheet handling operations. Therefore, the prior art has attempted to minimize the build-up of electrostatic charges on paper or similar material by providing static discharge devices for dissipating accumulated charges on sheets.

Electrostatic forces have been intentionally produced in certain prior art sheet handling apparatus, particularly where a sheet is to be held down against a member which is stationary with respect to the sheet. These electrostatic holding devices employ positive and negative electrical power supply electrodes each of which is covered by a material having a relatively high electrical resistance. The covered electrodes engage a sheet to be held down at spaced locations thereby generating a small current in the sheet. The voltage drop across the material covering each electrode produces a large voltage difference between the sheet and each electrode. This produces a force for holding the sheet in position.

Aside from these static hold down devices, the prior art has principally concerned itself with elimination of electrostatic charges and forces in paper or film handling equipment.

SUMMARY OF THE INVENTION

The present invention provides a new and improved material handling apparatus in the form of an electrostatic conveyor in which electrostatic charges are induced in material being handled. Electrostatic forces created by the charges are instrumental in maintaining the moving material positively secured to the conveyor at high conveying speeds regardless of expectable misalignment of the sheets and without tracking.

The new conveyor employs an article conveyor member which engages and moves relative to a triboelectrically different member so that a charge is created on the triboelectrical different member. The conveyor member is electrically conductive transverse to its direction of movement relative to the triboelectrically different member and non-conductive in the direction of relative movement. When an article is placed on the conveyor member, charge is transferred to the article through the conveyor member transverse to its direction of relative movement. The article is urged into frictional engagement with the conveyor member with electrostatic force so that the article is moved along with the conveyor member.

In a preferred embodiment, the new conveyor includes a plurality of endless cloth belts which extend across a feed table. The conveyor belts all move at the same speed and support sheets received from a suitable feeder. The belts convey the sheets individually across the feed table.

The feed table itself is electrically grounded and a plurality of non-conductive, high triboelectrically negative charging strips are interposed between the belts and the feed table. The belts and the charging strips cooperate to form an electrostatic generator. The charging strips, because of their triboelectric property have an affinity for the electrons in the associated conveyor belt. Thus, as the belt moves across the charging strip, electrons are deposited on the charging strip by the belt. This causes the surface of the charging strip engaging the belt to become negatively charged with respect to the grounded feed table. This voltage level at the charging strip and conveyor belt interface is several kilovolts negative with respect to the grounded feed table.

When a sheet is fed onto the conveyor belts, electric current is conducted from the charging strips transversely through the belts and to the sheet. The sheet becomes highly negatively charged relative to the feed table. The sheet is thus electrostatically attracted to the feed table. Since the belts are between the sheet and the table, this attraction urges the sheet toward the belts and causes the sheet to frictionally hug the conveyor belts. Each sheet is driven across the feed table by the belts as a result of the frictional engagement between the sheets and belts.

The sheets and the belts are nearly at the same voltage level relative to ground and accordingly the sheets are not electrostatically attracted to the belt. For this reason, the belts are spaced apart on the feed table so that the sheets are attracted to the feed table between adjacent belts. The sheets are thus urged uniformly into engagement with each belt.

The charging strips are preferably composed of polytetrafluoroethylene, a product sold commercially by E. I. Dupont under the trademark TEFLON. This material has an extremely high resistance to electrical current flow, is non-conductive, is triboelectrically negative with respect to most other materials, and has a sufficiently low surface energy that foreign matter does not adhere to its surface.

The belts are approximately neutral on the triboelectric scale and are preferably woven from fibrous material having a relatively high electrical resistivity. The belts have an extremely high electrical resistance measured in the plane of the belt; however since the belts are thin, the electrical resistance measured through their thickness is not extremely large even though the resistivity of the belt material is high. This enables current to be conducted through the belts to sheets riding on them.

A conveyor constructed in accordance with the present invention maintains a sheet in frictional contact with each individual belt. Where the printed image on a sheet being conveyed is facing the belts, the image is not tracked because of the nap, or fibrous nature of the surface of the belts.

Since the charge on the sheet is distributed across the entire face of the sheet, the sheet is maintained in frictional engagement with each conveyor belt regardless of the orientation of the sheet with respect to the belt. Hence, misalignment of the sheet with respect to its direction of travel through the conveyor does not adversely effect conveyance of the sheet.

As a sheet moves from the conveyor, the charge on the sheet is substantially dissipated by a low energy arc to the grounded feed table. Even when stacked, sheets which have been conveyed by this new conveyor do not carry sufficient residual charges to cause them to cling tightly together.

A principal object of the present invention is the provision of a new and improved sheet conveyor mechanism utilizing electrostatic forces in conveying sheets.

Other objects and advantages of the present invention should become apparent from the following detailed description thereof made with reference to the accompanying drawings which form part of the specification.

DESCRIPTION OF THE PREFERRED EMBODIMENT

Figure 1:
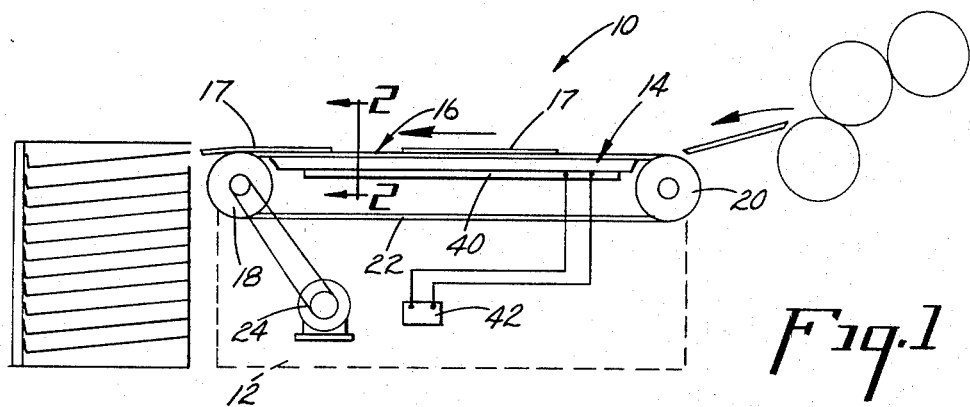
FIG. 1 is a schematic side elevational view of a conveyor embodying the present invention.

A sheet handling apparatus 10 employing the present invention is illustrated in FIG. 1. The apparatus 10 is in the form of conveyor apparatus for sheets of paper which is positioned between a feeder and an acceptor device. The feeder may itself be a part of a lithographic printing press, or the like, which feeds the printed sheets directly to the apparatus 10. The acceptor device can be a collator, which is schematically shown, or other sheet handling device.

The apparatus 10 includes a machine frame 12 supporting a conveyor bed 14. A conveyor, generally designated at 16, is associated with the conveyor bed 14 for conveying sheets 17 in the direction shown by the arrows in FIG. 1.

The conveyor 16 includes pulleys 18, 20 supported at opposite ends of the conveyor bed. Sheets 17 are transported on the surface of endless belts 22 trained around the pulleys 18, 20. Belts 22 have upper reaches extending along the bed. A variable speed electric motor 24 drives the pulley 18 so that the belts 22 are positively driven across the conveyor bed 14. In the preferred and illustrated embodiment of the invention seven belts 22 are employed in the conveyor.

Figure 2:
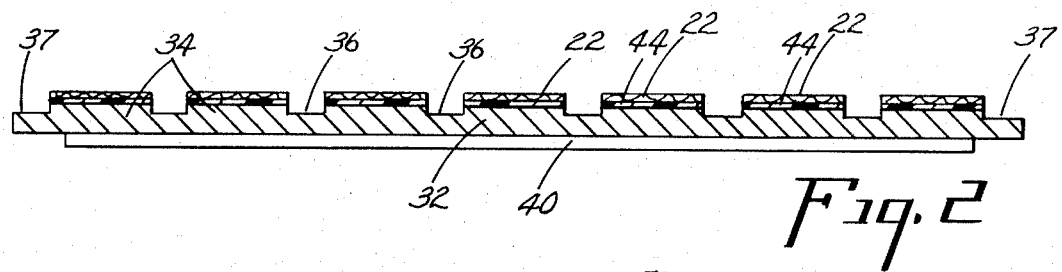
FIG. 2 is a cross sectional view seen from the plane indicated by the line 2—2 of FIG. 1.

The conveyor bed 14 includes a plate 32 (FIG. 2) formed by an aluminum extrusion defining seven spaced, parallel lands 34 projecting upwardly from the plate. The lands 34 define flat bottomed recesses 36 between them. The lands and recesses extend along the conveyor bed paralleling path of travel of the conveyed sheets 17. Preferably the lateral sides of the plate are formed by recessed portions 37 (FIG. 2). The upper reach of each belt 22 rides on a land 34. Each land has substantially the same width as the associated belt. Generically, the plate and its land area may be termed as a bed member. Usually the bed will actually support the belts against gravity, but not necessarily so. For example, the bed may be vertical.

An electrical heating element 40 is attached to the lower face of the feed table. The element 40 is energized to heat the plate from an electrical power supply through a suitable thermostatic control 42 (FIG. 1). The control 42 governs energization of the element 40 to maintain the plate 32 at a predetermined desired temperature. Heat from the plate is transferred to the belts in order to maintain the belts at a minimum desired dryness level. This assures that the electrical resistivity of the belts is not reduced as a function of humidity in the air ambient the apparatus.

Charging members 44 are disposed atop the lands 34 and each is interposed between a belt and its associated land. The charging members 44 are continuous strips of dielectric material. These are attached to the lands by an adhesive and extend the length of the table.

Figure 3:
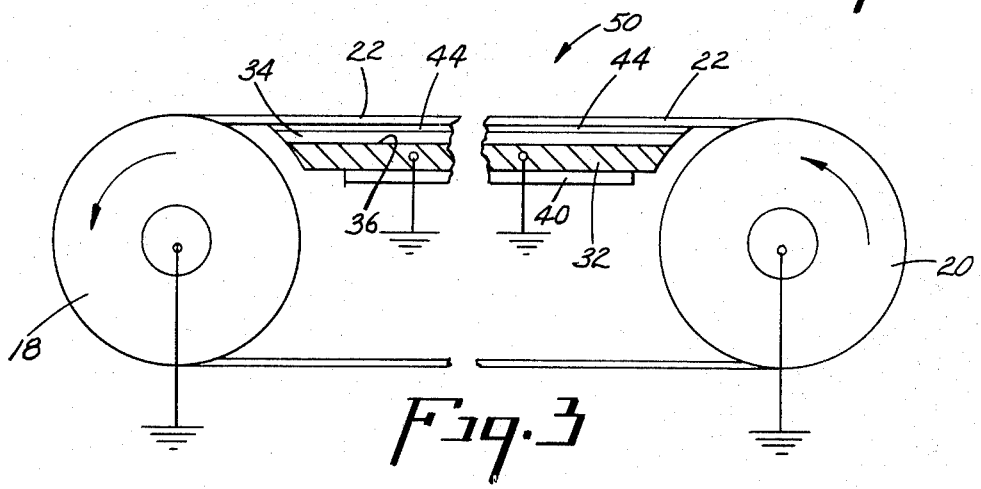
FIG. 3 is a schematic view of a portion of the apparatus shown in FIG. 1.

The belts 22, charging members 44 and plate 32 form an electrostatic generator which is generally designated at 50 (FIG. 3). The generator 50 produces electrostatic charges and concomitant electrostatic forces for maintaining sheets on the conveyor as the sheets advance. As shown in FIG. 3, the pulleys 18, 20 and plate 32 are electrically grounded as is the machine frame 12. The belts 22 are driven about the pulley 18, 20 with the upper reaches contacting the associated charging members 44.

Each belt 22 is constructed of material characterized by having a high electrical resistivity and relative neutrality on the triboelectric scale. In one conveyor which was successfully operated, the belts were stitched, two-ply cotton fabric 1 inch wide and 0.030 inch thick. A typical volume electrical resistivity for this material is about $10^{11}$ ohm/cm. Because of the relatively high resistivity of the cotton material, the belts have an extremely high electrical resistance measured in the plane of the belt. However, because the belts are thin, the electrical resistance measured transversely of the plane of the belts is not extremely large. The plate heater 40 prevents the belts from picking up moisture in the atmosphere which could otherwise reduce the resistivity of the belt material. This cotton material is relatively neutral in the triboelectric series; that is, the material has no more of a propensity for giving up electrons than for accepting electrons.

The surfaces of these belts are irregular, because of the projecting ends of the woven cotton fibers, and produces a soft nap. The nap on the upper surface of the belts enables each belt to engage recently printed sheets over an extremely large number of small area locations. This type of engagement avoids ink transfer and thus materially reduces any tendency toward tracking.

The charging members 44 are preferably strips of polytetrafluoroethylene (TFE), a plastic material sometimes known by the trademark TEFLON. TFE is triboelectrically different from the cotton belt material and is close to the negative end of the triboelectric series. Thus when nearly any other material, including cotton, is rubbed on the TFE, the TFE material picks up electrons from the other material.

In addition to having a strong affinity for electrons, the TFE has an extremely high electrical resistivity (about $10^{16}$ ohm/cm). Thus, electrons deposited on the TFE are not conducted away from the TFE-belt interface through the TFE. Hence, the TFE tends to become electrically charged negative with respect to ground when the belts are moved.

The TFE is also advantageous for use as a charging member since dirt or other contaminants do not adhere to its surface. Even when foreign substances are disposed on the surface of the TFE, its affinity for electrons is not materially diminished as a result of the presence of the contaminants.

Because the TFE members 44 have an affinity for electrons when rubbed by the cotton belts, and due to the negative charge taken on by the TFE as the conveyor operates, the members 44 are, for convenience, referred to hereinafter as charging members.

As each belt 22 moves across its associated charging member 44, electrons are deposited by the belt on the associated charging member. Since the charging members 44 are nonconductive, the electrons remain on the surface 44a (FIG. 4) of the charging member 44 and the member becomes charged negative with respect to ground. Although electrons are constantly deposited on the charging members 44 as the belts move, the negative charge is maintained at a relatively constant peak level. When the peak level is reached, electrons are dissipated from the charging members 44 by arc discharges from the edges of the charging members 44 to the grounded conveyor bed 14 at the same rate electrons are deposited on the charging members 44 by the belts. As the belts 22 pass over the grounded pulley 18, electrons are supplied to the belts from the pulley to replace the electrons deposited on the charging members 44.

The peak charge level has been found to depend primarily on the thickness of the charging members 44 since this thickness determines the length of the air gap through which the arc discharges occur. In a preferred construction, the charging members are 0.01 inches thick and are charged to about 7 kilovolts negative with respect to the voltage level of the feed table. The thickness of the TFE can be increased or decreased to respectively increase or decrease the charge level.

Figure 4:
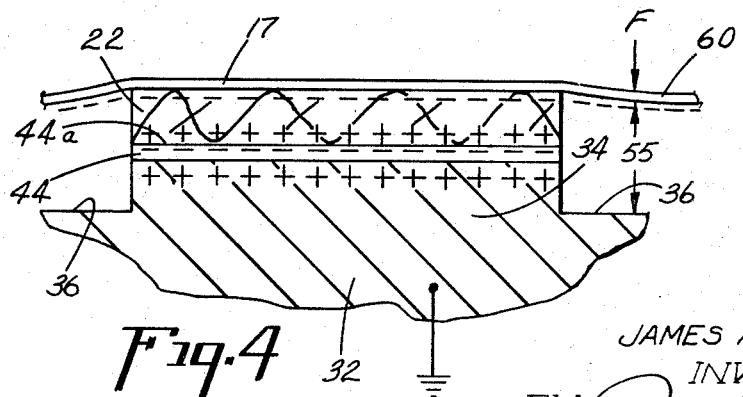
FIG. 4 is a fragmentary view of one belt land area of those shown in FIG. 2, on a scale which is larger than the scale of FIG. 2.

The charge relationship between the various elements of the generator 50 are shown schematically in FIG. 4. It will be noted that the belt-charging member interface is negative on the charging member face and positive at the belt face. This charge relationship causes each belt to cling to its associated charging member whenever the belt moves relative to the charging member. Hence belt tensioning mechanisms are not required for maintaining the belts in contact with the charging members. Moreover because the belts cling to the charging members the conveyor can be oriented as desired without altering its performance. For example, the conveyor can be inverted or inclined from its orientation shown in FIG. 1.

When a sheet of paper is introduced onto the conveyor belts, electrons are conducted through the belts from the charging members 44 transversely of the plane of the belts and to the paper. The paper is somewhat conductive and hence the entire surface of the paper facing the feed table becomes charged to a relatively large negative voltage with respect to the feed table. This charge distribution is shown schematically in FIG. 4. The sheet does not have a large capacity for electrons and hence becomes negatively charged, as described, as a result of a current flow which is not sufficiently large to dissipate charge from the members 44.

It should be noted that paper which has recently been printed in a lithographic type printing press is sufficiently moist that the surface of the paper is sufficiently electrically conductive to receive electrons from the charging members. Electrically conductive materials, and paper or plastic film having conductive coatings are also readily conveyed by the new conveyor. Where paper is not sufficiently moist to be advanced by the conveyor, the humidity ambient the conveyor or feeder associated with it should be increased to produce adequate conductivity of the paper.

The portions of the sheet which overlie the recesses 36 in the feed table are electrostatically attracted to the feed table across an air gap 55 between the sheet and the bottom of each recess 36. When light weight paper is conveyed, these portions are apt to dish as shown at 60 (FIG. 4). The recesses 36 are sufficiently deep that the dished portions 60 will not engage the bottoms of the recesses and discharge the sheet. Air is a dielectric, but a solid dielectric may be used to prevent sheet sag if needed.

The electrostatic force of attraction between the sheet and bottom of the recesses causes the sheet to be urged into frictional engagement with the belts so that the belts positively convey the sheet as the electrostatic force maintains the sheet in contact with the belts. In practice it has been found that the lands, charging members 44 and belts should be greater than one half inch wide in order to produce suitably large electrostatic frictional forces between the sheet and the conveyor. Preferably the belt, lands and charging members 44 are about 1 inch wide and the recesses 36 about three-eighths inch wide. It has also been found that the belts should move relative to the charging members at least at 25 inches per second for optimum generation of electrostatic forces.

When the sheet 17 moves off the end of the conveyor unit, the distance between the feed table and the sheet increases substantially resulting in an extremely high voltage across the now enlarged air gap between the sheet and the feed table. When this occurs, the charge on the sheet is dissipated by a low energy arc established between the grounded machine frame and the sheet. Thereafter, the sheet is substantially uncharged, or at least is sufficiently slightly charged that when stacked with other similar sheets each sheet is relatively easily removed from the stack.

What is claimed is:

1. A conveyor for articles comprising:
   a support bed having a bed surface;
   a conveyor assembly comprising at least one conveyor member supported for movement on a path of travel across at least a portion of said bed surface;
   said conveyor member having a first surface oriented toward said bed and a second obverse article transport surface facing away from the bed; and,
   charge means for establishing a first charge level between said bed and said first surface and a second charge level between said second surface and an article thereon, said first and second charge levels being unequal and producing an electrostatic force urging said article toward said bed and into frictional engagement with said conveyor member to cause said conveyor member to advance an article across said bed.

2. A conveyor as claimed in claim 1 wherein said charge means is comprised of an electrostatic generator formed by said at least one conveyor member and a nonconductive charging member interposed between and contacting said bed surface and said conveyor member, said conveyor member and said nonconductive charging member movable relative to each other and being triboelectrically different.

3. A conveyor as claimed in claim 2 wherein said conveyor member comprises a flat belt member having a low resistance to electric current flow transversely to the plane of said belt as compared to the electrical resistance of the belt in its plane.

4. A conveyor for articles comprising:
   a support bed having a bed surface;
   a conveyor assembly comprising at least one conveyor member comprising a flat belt supported for movement on a path of travel across at least a portion of said bed surface;

said conveyor member having a first surface oriented toward said bed and an obverse article transport surface facing away from the bed; and, charge means for establishing a charge across said article transport surface and said bed whereby as article placed on said article transport surface substantially assumes the charge level of said article transport surface and an electrostatic force urges said article toward said bed and into frictional engagement with said conveyor member to cause said conveyor member to advance an article across said bed;

said charge means comprising an electrostatic generator formed by said at least one conveyor member and a nonconductive charging member interposed between said bed surface and said conveyor member, said charging member contacting said bed surface and defining a surface engageable with said belt;

said conveyor member and said nonconductive charging member movable relative to each other and said charging member surface formed by a material which is triboelectrically negative with respect to the belt and has a low surface energy whereby electrons are deposited on said charging member surface by said belt and said charging member surface resists adhesion of foreign matter.

5. A conveyor as claimed in claim 4 wherein said belt member is comprised of a woven fibrous material which is about neutral on the triboelectric scale.

6. A conveyor as claimed in claim 2 wherein said bed surface is electrically grounded whereby an electrostatic charge is created across said charging member and said bed surface.

7. A conveyor for articles comprising:

a support bed having a bed surface;

a conveyor assembly comprising at least one conveyor member comprising a flat endless belt supported for movement on a path of travel across at least a portion of said bed surface;

said conveyor member having a first surface oriented toward said bed and an obverse article transport surface facing away from the bed; and, charge means for establishing a charge across said article transport surface and said bed whereby an article placed on said article transport surface substantially assumes the charge level of said article transport surface and an electrostatic force urges said article toward said bed and into frictional engagement with said conveyor member to cause said conveyor member to advance an article across said bed;

said charge means comprising an electrostatic generator formed by said at least one conveyor member and a nonconductive charging member interposed between and contacting said bed surface and said conveyor member, said conveyor member and said nonconductive charging member movable relative to each other and being triboelectrically different;

said belt having a low resistance to electric current flow through its thickness as compared to its electrical resistance in its plane and effective to conduct current to an article on said article transport surface from said charging member whereby an article is charged relative to said bed surface and electrostatically attracted to said bed surface.

8. An electrostatic conveyor apparatus for sheet or film-like material comprising:

an electrically grounded conductive support member;

a conveyor comprising a plurality of coextending generally parallel endless belts extending along said support member at spaced apart locations;

drive means for moving said belts relative to said support member;

a plurality of coextending generally parallel charging members attached to said support member and extending along said support member at spaced apart locations, each belt overlying and coextending with a respective one of said charging members whereby each belt slidingly contacts its associated charging member when said belt moves along said support member;

each of said belts comprised of material having a high electrical resistance parallel to said charging member and a relatively low resistance transverse to said charging member; and, each of said charging members being triboelectrically different from its associated belt.

9. Apparatus as claimed in claim 8 wherein said belts and said charging members are no less than about one-half inch wide, and further including structure providing a dielectric material between adjacent belts, said dielectric material interposed between adjacent belts, said dielectric material interposed between conveyed material bridging said belts and said support member.

10. Apparatus as claimed in claim 9 wherein said structure includes a plurality of recesses formed in said support member between said belts, said recesses defining a space between conveyed material on said belts and said support member, said dielectric material comprising air in said space.

11. Apparatus as claimed in claim 8 wherein said belts are formed from a woven fabric material having a high electrical resistivity and said charging members are defined by thin strips of material characterized by having an extremely high electrical resistivity and being triboelectrically negative with respect to the belt material.

12. Apparatus as claimed in claim 11 wherein said charging members are composed at least principally of polytetrafluoroethylene.

13. Apparatus as claimed in claim 8 and further including heater means for heating said belts to a predetermined temperature whereby to limit the moisture content of said belts and control their electrical resistivity.

14. A method of conveying articles comprising:

providing a conveyor bed;

supporting a conveyor belt along the bed;

moving the conveyor belt relative to the bed;

placing an article on an article engaging surface of the conveyor belt;

electrically insulating the article from the bed;

establishing a charge across the article and bed while maintaining the article and the article engaging surface of the conveyor belt at substantially the same charge level to substantially prevent electrostatic attraction between the article and the article engaging surface of the conveyor belt;

attracting the article toward the bed by said charge to establish a frictional conveying force between the article and the article engaging surface; and, conveying the article with the belt relative to the bed.

15. A method as claimed in claim 14 wherein electrically insulating the belt from the bed comprises interposing a nonconductive charging member between said belt and said bed and establishing a charge across the article and bed comprises engaging the belt with a surface of the charging member as the belt moves relative to the charging member and creating a charge across the charging member surface and the bed.

* * * * *